United States Patent
Hermens et al.

(10) Patent No.: US 11,097,980 B2
(45) Date of Patent: Aug. 24, 2021

(54) TRANSPARENT FIRE PROTECTION GLAZING HAVING BURGLARY-RESISTANT AND ANTIPANIC PROPERTIES

(71) Applicant: SAINT-GOBAIN GLASS FRANCE, Courbevoie (FR)

(72) Inventors: Ulrich Hermens, Aachen (DE); Rolf Kochs, Aachen (DE); Marcus Neander, Eschweiler (DE); Olaf Kowalke, Düren-Arnoldsweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/318,579

(22) PCT Filed: Jun. 9, 2017

(86) PCT No.: PCT/EP2017/064109
§ 371 (c)(1),
(2) Date: Jan. 17, 2019

(87) PCT Pub. No.: WO2018/015066
PCT Pub. Date: Jan. 25, 2018

(65) Prior Publication Data
US 2019/0241464 A1     Aug. 8, 2019

(30) Foreign Application Priority Data
Jul. 18, 2016 (EP) .................................. 16179927

(51) Int. Cl.
*C03C 17/34* (2006.01)
*B32B 17/10* (2006.01)

(52) U.S. Cl.
CPC ........ *C03C 17/34* (2013.01); *B32B 17/10045* (2013.01); *B32B 17/1077* (2013.01);
(Continued)

(58) Field of Classification Search
CPC ........................ C03C 17/34; B32B 17/10761
(Continued)

(56) References Cited

U.S. PATENT DOCUMENTS 4,444,825 A * 4/1984 Vanderstukken ...........................
B32B 17/10045
428/215
5,496,640 A 3/1996 Bolton et al.
(Continued)

FOREIGN PATENT DOCUMENTS

DE   25 07 244 B1   10/1975
DE   32 31 975 A1   3/1983
(Continued)

OTHER PUBLICATIONS

Machine_English_translation_WO_2005115746_A1; Goelff Pierre; Fireproof Glazing; Dec. 8, 2005; EPO; whole document (Year: 2005).*

(Continued)

*Primary Examiner* — Tahseen Khan
(74) *Attorney, Agent, or Firm* — Pillsbury Winthrop Shaw Pittman LLP

(57) ABSTRACT

A transparent, burglary-resistant fire protection glazing includes at least one centrally arranged, burglary-resistant composite that includes at least one transparent plastic pane, at least two fire protection units arranged on both sides of the centrally arranged, burglary-resistant composite, and two outer surfaces opposite one another.

18 Claims, 2 Drawing Sheets

(52) U.S. Cl.
CPC .. *B32B 17/10311* (2013.01); *B32B 17/10761* (2013.01); *B32B 2250/22* (2013.01); *B32B 2250/24* (2013.01)

(58) Field of Classification Search
USPC .......................................................... 428/212
See application file for complete search history.

(56) References Cited

U.S. PATENT DOCUMENTS

| | | | | |
|---|---|---|---|---|
| 2011/0135940 | A1* | 6/2011 | Greer | B32B 17/04 428/429 |
| 2014/0162039 | A1* | 6/2014 | Zachau | F41H 5/0407 428/219 |

FOREIGN PATENT DOCUMENTS

| | | | | |
|---|---|---|---|---|
| DE | 10 2005 006 748 | A1 | 8/2006 | |
| DE | 102005006748 | A1 * | 8/2006 | ............ C09K 21/02 |
| DE | 10 2010 037 966 | A1 | 4/2012 | |
| DE | 102010037966 | A1 * | 4/2012 | ............ B32B 17/10 |
| DE | 102011050039 | A1 * | 11/2012 | ............ F41H 5/263 |
| EP | 1 398 147 | A1 | 3/2004 | |
| JP | 2014-061640 | A | 4/2014 | |
| WO | WO 2005/115746 | A1 | 12/2005 | |
| WO | WO-2005115746 | A1 * | 12/2005 | ....... B32B 17/10045 |

OTHER PUBLICATIONS

Machine_English_translation_DE_102010037966_A1; Wehmeier Lutz Dr; Composite Plate; Apr. 5, 2012; EPO; whole document (Year: 2012).*

Machine_English_translation_DE_102005006748_A1; Dieckmann Udo; Transparent fire-Protection glazing; Aug. 24, 2006; EPO; whole document (Year: 2006).*

Machine_English_translation_DE_102011050039_A; Wehmeier, L.; Bullet resistant flame retardant glazing; Aug. 11, 2012; EPO; whole document (Year: 2012).*

International Search Report as issued in International Patent Application No. PCT/EP2017/064109, dated Aug. 16, 2017.

* cited by examiner

TRANSPARENT FIRE PROTECTION GLAZING HAVING BURGLARY-RESISTANT AND ANTIPANIC PROPERTIES

CROSS-REFERENCE TO RELATED APPLICATIONS

This application is the U.S. National Stage of PCT/EP2017/064109, filed Jun. 9, 2017, which in turn claims priority to European patent application number 16179927.5 filed Jul. 18, 2016. The content of these applications are incorporated herein by reference in their entireties.

FIELD OF THE INVENTION

The present invention relates to a transparent fire protection glazing with burglary-resistant and antipanic properties, a method for production thereof, and use thereof.

PRIOR ART

Conventional window glasses are unsuitable as fire protection barriers because they burst with every relatively strong thermal load. The fire and the resulting heat radiation can spread unchecked. The reason for this resides in their relatively high coefficient of thermal expansion and their relatively low tensile strength. Consequently, in order to prevent the bursting of glass panes from fire for a longer time, wire meshes that hold the structure together even after glass breakage are even introduced into 6-to-8-mm-thick panes. However, due to the reduced light permeability, their use is limited to partitions, doors, and skylights. By now, a number of wire-free fire protection glasses that are also suitable for window construction have been developed.

The term "fire protection glazings" is generally understood to mean components that are made of one or a plurality of light-permeable systems that are mounted in a frame with holders and seals. In terms of their fire resistance classes, a distinction is made between EI and E glazings. Such glazings are additionally characterized by the indication of the duration of their fire resistance in minutes (e.g.: EI 30, EI 90, E 30, EI 120). E glazings prevent only the spread of fire and smoke for the corresponding time. In addition, EI glazings must prevent the passage of heat radiation.

Currently common as EI glazings are combined systems of fire protection panes and fill layers between the panes. In this multipane glazing, the fill layers foam in the event of fire and thus act as a heat shield. The foaming is also referred to as intumescence. These fill layers can be either organic or inorganic or a combination of the two. Their task is to delay the transfer of heat, on the one hand, by endothermic processes, such as vaporization in the fill layers; on the other, forming an insulating residue, such as foam, which is intended to adhere well to the glass.

Although these fire protection glazings can solve the problem of the spread of fire, they have no attack resistant or penetration resistant properties, as a result of which they are also not burglary resistant.

Known from German patent application DE 10 2010 037 966 A1 is a monolithic, attack resistant, and fire-resistant glazing. This glazing has at least one intumescent fire protection layer, wherein at least one plastic layer (plastic pane) is arranged in each case directly or indirectly on the opposite side surfaces of the fire protection glazing. At least one glass or glass ceramic pane is arranged in each case on the sides of the plastic layer facing away from the fire protection glazing. When the plastic content in front of or behind the fire protection glass reaches a certain mass, it does, in fact, positively affect burglary resistance but negatively affects fire behavior.

Fire protection glazings are frequently intended to be used in so-called "antipanic glazings". This means doors that, even in the locked state, can be opened from one direction, typically outward from the interior of the building involved, for example, by an opening such that they open the way for escaping crowds out of the interior. Special penetration resistant properties must be provided on such a glazing because the opening lever is accessible from the outside through the creation of a relatively small hole by which means the door can also be opened from the outside.

WO 2005/115746 A1 discloses complex fire protection glazings that can be made of fire protection units connected to one another that consist in each case of a plurality of glass panes connected to one another via intumescent layers. However, the fire protection glazings have no plastic panes to increase burglary resistance. Their burglary-resistant properties are therefore slight.

A similar fire protection glazing is known from DE 3231975 A1. Here, again, no plastic panes are provided to obtain burglary-resistant properties.

US 2011/0135940 A1 discloses a fire protection glazing with burglary-resistant properties. The burglary-resistant properties are obtained by means of reinforced silicone films with a thickness of as much as 100 μm.

The object of the present invention was to propose a transparent fire protection glazing with particularly good burglary-resistant properties that overcomes the disadvantages of the prior art and can also be used in antipanic glazings. In particular, the negative effect of thick plastic sheets on fire protection was to be avoided. And last but not least, the new transparent, burglary-resistant fire protection glazings with antipanic properties were to be capable of being produced quickly, precisely, and with only very few if any rejects using conventional methods such that no special procedural measures would have to be taken.

These and other objects are accomplished according to the proposal of the invention by the transparent burglary-resistant fire protection glazing with antipanic properties and the method for their production with the features of the independent claims. Advantageous embodiments of the invention are disclosed through the features of the dependent claims.

DETAILED DESCRIPTION OF THE INVENTION

The invention relates to a transparent, burglary-resistant fire protection glazing having antipanic properties.

The term "fire protection glazings" is generally understood to mean components that are made of one or a plurality of light-permeable systems that are mounted in a frame with holders and seals. In terms of their fire resistance classes, a distinction is made between EI and E glazings. Such glazings are additionally characterized by the indication of the duration of their fire resistance in minutes (e.g.: EI 30, EI 90, E 30, EI 120). E glazings prevent only the spread of fire and smoke for the corresponding time. In addition, EI glazings must prevent the passage of heat radiation.

The transparent glazing according to the invention preferably has transmittance in the visible spectral range of at least 20%, particularly preferably at least 50%. A transparent glazing or a transparent component of a glazing can have transmittance in the visible spectral range >70%.

In the context of the invention, "burglary-resistant" refers to fire protection glazings if they are secure against manual attack and ballistic attack (cf. DIN 1627 ff.). Depending on the protective effect, they are divided into five different resistance classes with increasing protective effect (EH01, EH02, EH1, EH2, EH3).

In the context of the invention, an "antipanic glazing" is understood to be a glass door which can be opened simply in one direction at any time. For this purpose, the glass doors usually have an opening lever which extends readily accessibly over the entire width of the glass door and is actuated by pressure. The opening lever is typically arranged toward the interior such that the door can be opened outward. If a panic occurs in the interior, for example, caused by escaping crowds, the door can be opened in a simple manner at any time in order to open an escape route. However, in terms of burglary security, such antipanic glazings can be disadvantageous, as it suffices to provide the glazing with a relatively small breakthrough (hole) in order to be able to actuate the opening lever from the outside. Consequently, antipanic glazings should have burglary-resistant properties in order to increase the effort for producing such a breakthrough.

The transparent, burglary-resistant fire protection glazing includes at least one, in particular one centrally arranged, burglary-resistant composite. The centrally arranged composite includes at least one transparent plastic pane. The term "plastic pane" means a rigid pane, in contrast, for example, to a flexible plastic film. In a preferred embodiment, the burglary-resistant composite includes at least two transparent plastic panes that are adhesively bonded by means of an adhesion-promoting layer. The thickness of the plastic panes is preferably from 1 mm to 15 mm, particularly preferably from 6 mm to 12 mm, meaning the total thickness of the optionally multiple plastic panes.

Transparent, impact-resistant technical plastics with glass transition temperatures above 100° C. and melting temperatures above 100° C., preferably above 200° C., can be used as plastics here. In particular, polycarbonate or polymethyl methacrylate are used.

The thickness of the burglary-resistant composite is preferably at least 1 mm, particularly preferably at least 2 mm. The thickness of the burglary-resistant composite is, in an advantageous embodiment, from 1 mm to 15 mm, preferably from 2 mm to 15 mm, preferably from 6 mm to 12 mm. High thickness of the plastic panes improves, in particular, the burglary-resistant effect of the glazing. For antipanic glazings, the thickness of the burglary-resistant composite is advantageously at least 8 mm, for example, from 8 mm to 15 mm or from 8 mm to 12 mm.

The adhesion-promoting layers can be adhesive layers or films. Preferably used are films made of plastic. Preferably, the films are made of a plastic selected from the group consisting of polyvinyl butyral (PVB), ethylene vinyl acetate (EVA), polyurethane (PU), polypropylene (PP), polyacrylate, polyethylene (PE), polycarbonate (PC), polymethyl methacrylate (PMMA), polyvinyl chloride (PVC), polyacetate resin, casting resins, polyacrylates, fluorinated ethylene-propylene copolymers, polyvinyl fluoride, and/or ethylene-tetrafluoroethylene copolymers. In particular, polyvinyl butyral (PVB) or polyurethane (PU) is used. In the context of the invention, the adhesion-promoting layer is, in particular, not an intumescent layer, but instead serves only for the bonding of two panes.

The thickness of the adhesion-promoting layers is preferably from 0.3 mm to 5 mm, particularly preferably from 0.76 mm to 2.5 mm.

In one embodiment of the invention, the burglary-resistant composite comprises at least two plastic panes and at least one glass pane. This further increases the burglary-resistant effect. The glass pane is arranged between the two plastic panes, and, for example, is bonded thereto via adhesion-promoting layers. This further increases the stability of the burglary-resistant composite. The glass pane can be thermally or chemically tempered to further increase break resistance. A composite pane, i.e., at least two glass panes bonded to one another via a thermoplastic intermediate layer, can also be arranged between the plastic panes.

The burglary-resistant fire protection glazing further includes at least two, in particular two, fire protection units arranged on both sides of the centrally arranged burglary-resistant composite. The fire protection units preferably have in each case an outer surface that delimits the fire protection glazing.

The burglary-resistant composite negatively affects the fire behavior of the glazing due to its high plastic content (high fire load). By means of the fire protection units arranged on both sides, the burglary-resistant composite is protected in the event of fire such that it cannot catch fire or only does so after a significant delay. This is the major advantage of the present invention.

Each fire protection unit comprises at least two, in particular three, glass panes adhesively bonded by means of a transparent, intumescent layer. The fire protection units can in each case have the same number or different numbers of glass panes. Preferably, they have the same number of glass panes.

In an advantageous embodiment, an additional glass pane is arranged between at least one of the fire protection units and the burglary-resistant composite, preferably between each fire protection unit and the burglary-resistant composite. The bonding is again preferably done via adhesion-promoting layers. In other words, the fire protection units are, in each case, connected via at least one, in particular one, additional glass pane to, in each case, a side surface of the centrally arranged, burglary-resistant composite by means of at least one, in particular one, of the above-described adhesion-promoting layers. Likewise, the glass panes are adhesively connected to the burglary-resistant composite by means of at least one, in particular one, adhesion-promoting layer. The centrally arranged, burglary-resistant composite is connected to the two additional glass panes. One of the additional glass panes that are positioned opposite one another is adhesively connected by means of at least one adhesion-promoting layer to the first fire protection unit with the first outer side and the other one of the additional glass panes that are positioned opposite one another is adhesively connected by means of at least one adhesion-promoting layer to the second fire protection unit with the second outer side. The advantage of the additional glass panes resides in the increase in glass content and, thus, in the resistance of the fire protection glazing. The glass content could also be obtained by enlarging the fire protection units by additional glass panes, which is, however, more expensive due to the additional intumescent layers.

Preferably, the glass panes of the fire protection glazing and in particular of the fire protection units are made of at least one glass, selected from the group consisting of flat glass, float glass, quartz glass, borosilicate glass, soda lime glass, and ceramic glass. Preferably, the fire protection units are made of soda lime glass.

The thickness of the glass panes is preferably from 3 mm to 15 mm, particularly preferably from 3 mm to 8 mm. This refers to the thickness of each individual glass pane.

The transparent, intumescent layers are made of alkali silicates and/or of salt-filled aqueous acrylic polymers. Preferably, alkali silicates are used, in particular sodium silicate. Examples of suitable transparent, intumescent layers are found in international patent application WO 2007/11887 A1.

The thickness of the intumescent layers is preferably from 2 mm to 8 mm, particularly preferably from 3 mm to 6 mm.

The fire protection glazing and in particular the fire protection units can be stabilized against UV radiation. Examples of suitable stabilizers are known from German patent application DE 10 2005 006 748 A1 and European patent application EP 1 398 147 A1.

The invention also includes an antipanic door, containing a fire protection glazing according to the invention, preferably arranged in a frame system, and a one-sided opening mechanism that is suitable for opening the antipanic door in one direction at any time and in any locking status, in particular an opening lever. The opening mechanism is arranged on the interior side toward the room or building closed by the door and the door typically can be opened outward.

Preferably, the transparent, burglary-resistant fire protection glazing is produced by constructing a laminate composite by precisely superimposing the individual planar pane elements and introducing them in the bag process into an autoclave furnace and adhesively bonding the pane elements at elevated temperature and pressure (cf. German patent application DE 10 2010 037 966 A1, page 4, paragraph [0021]).

The transparent, burglary-resistant fire protection glazing can be used in many ways. Thus, it can be used as a movable or stationary functional and/or decorative single piece and as a built-in component in furniture, appliances, buildings, and means of transportation. In particular, it is used where there is a high risk of burglary associated with a high risk of fire. For example, it is used as an architectural construction element (in particular as a component of a glass door or a stationary glazing) in buildings, such as museums, banks, airports, terminals, or railway stations, where large crowds develop and/or valuables, expensive goods, works of art, or hazardous materials are used or stored, particularly preferably as antipanic glazing.

BRIEF DESCRIPTION OF THE FIGURES

The invention is described in detail with reference to an exemplary embodiment and a comparative example according to the prior art. They depict in simplified, not-to-scale representation:

In FIG. 1, the reference characters have the following meaning:
1 transparent, burglary-resistant fire protection glazing
2 centrally arranged, transparent, burglary-resistant composite
2.1, 2.2 transparent plastic panes of the composite 2
3.1, 3.2 glass panes directly adjacent the centrally arranged composite 2
4 transparent, adhesion-promoting layer
4.1, 4.2
4.3, 4.4
4.5 transparent, adhesion-promoting layers between 2.1 and 2.2, 2.1 and 3.1, 2.2 and 3.2, 3.1 and 5.3, as well as 3.2 and 7.1
5 fire protection unit facing the outer surface AF1
5.1, 5.2,
5.3 glass panes of the fire protection unit 5
6 transparent, intumescent layer
6.1, 6.2 transparent, intumescent layers of the fire protection unit 5
7 fire protection unit facing the outer surface AF2
7.1, 7.2,
7.3 glass panes of the fire protection unit 7
8 transparent, intumescent layer
8.1, 8.2 transparent, intumescent layers of the fire protection unit 7
AF1, AF2 outer surfaces of the fire protection glazing 1 that are opposite one another In FIG. 2, the reference characters have the following meaning:
A transparent, burglary-resistant fire protection glazing
AF1, AF2 outer surfaces of the fire protection glazing A that are opposite one another
b centrally arranged fire protection unit
b1, b2,
b3 glass panes of the fire protection unit b
c1, c2 transparent, intumescent layers of the fire protection unit b
d1, d2 transparent plastic panes
e1, e2,
e3, e4 adhesion-promoting layers
f1, f2 outer glass panes that are opposite one another

DETAILED DESCRIPTION OF THE FIGURES

FIG. 1

Figure 1:
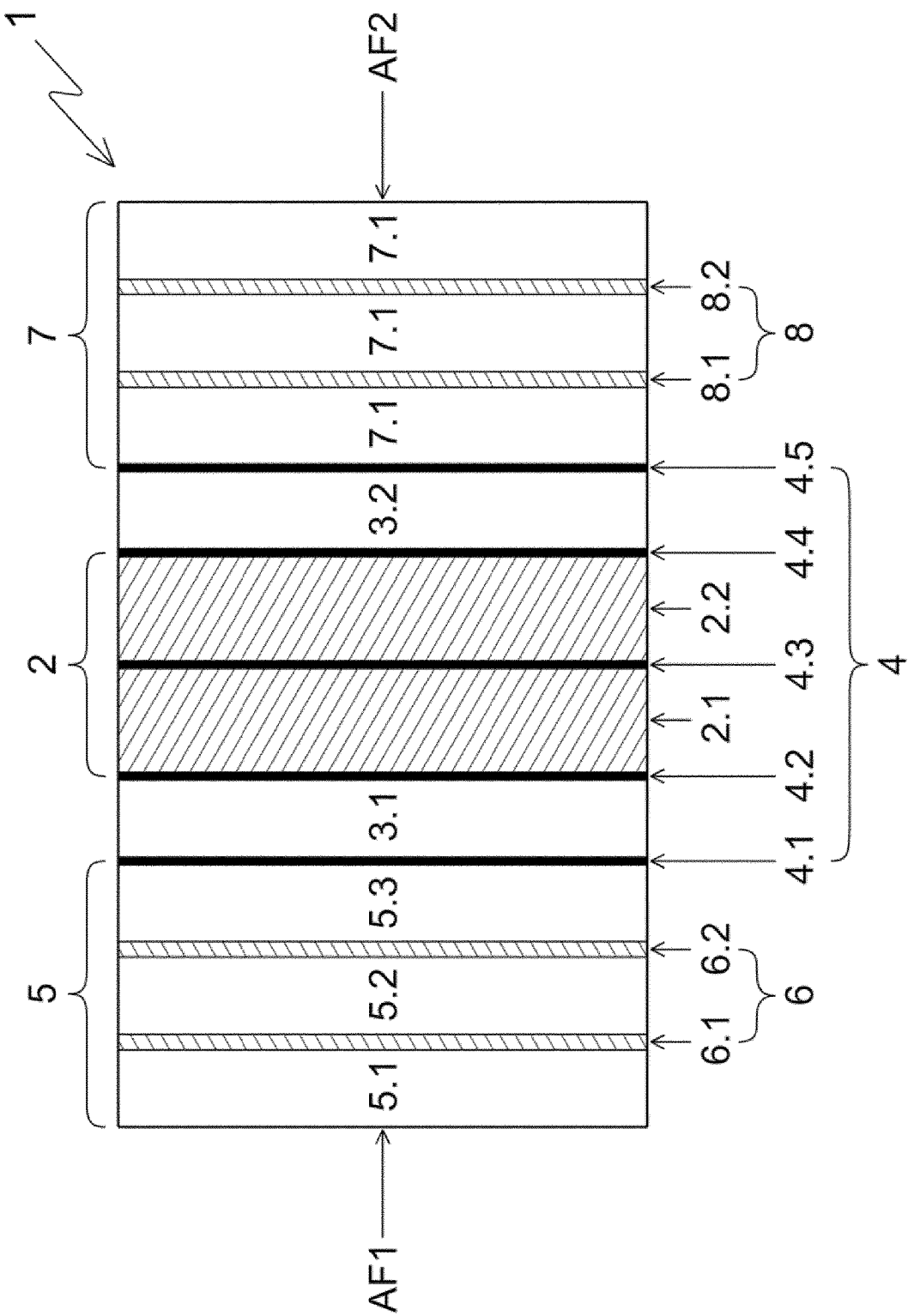
FIG. 1 a vertical longitudinal section through a detail of the transparent, burglary-resistant fire protection glazing and FIG. 2 a vertical longitudinal section through a detail of a transparent, burglary-resistant fire protection glazing according to the prior art.

FIG. 1 depicts a vertical longitudinal section of a detail of an embodiment of the transparent, burglary-resistant fire protection glazing 1 according to the invention.

The fire protection glazing 1 according to the invention had the dimensions 1 m×1 m. It was secured in a suitable steel frame.

The centrally arranged, transparent, burglary-resistant composite 2 was 3 mm thick and was formed from two polycarbonate panes 2.1 and 2.2 adhesively bonded by means of a polyurethane film 4.3. The two opposite surfaces of the composite 2 were bonded in each case by means of a polyurethane film 4.2 and 4.4 to two 4-mm-thick float glass panes 3.1 and 3.2. The outer sides of the two float glass panes 3.1 and 3.2 were in each case adhesively bonded by means of a polyurethane film 4.1 and 4.5 to a fire protection unit 5 and to a fire protection unit 7. The two fire protection units 5 and 7 were made in each case of two float glass panes 5.2 and 5.3 and 7.1 and 7.2 as well as a float glass pane 5.1 associated with the outer side AF1 and a float glass pane 7.3 associated with the outer side AF2. AH glass panes had a thickness of 4 mm.

Between the glass panes 5.1 and 5.2 as well as 5.2 and 5.3, a 3-mm-thick transparent, intumescent alkali silica layer 6.1 and 6.2 was arranged in each case. In the same manner, between the glass panes 7.1 and 7.2 as well as 7.2 and 7.3, a 3-mm-thick transparent, intumescent alkali silica layer 8.1 and 8.2 was arranged in each case. AH transparent, intumescent layers 6 and 8 were UV stabilized. Examples of suitable UV stabilizers are known from the German patent application DE 10 2005 006 748 A1.

The transparent, burglary-resistant fire protection glazing 1 according to the invention complied with the requirement EI 120. It effectively prevented break-ins since it could be pierced only with great difficulty—if at all.

In an improvement, an additional glass pane (not shown) can be arranged between the polycarbonate panes 2.1 and 2.2; the stability is further increased as a result.

FIG. 2

Figure 2:
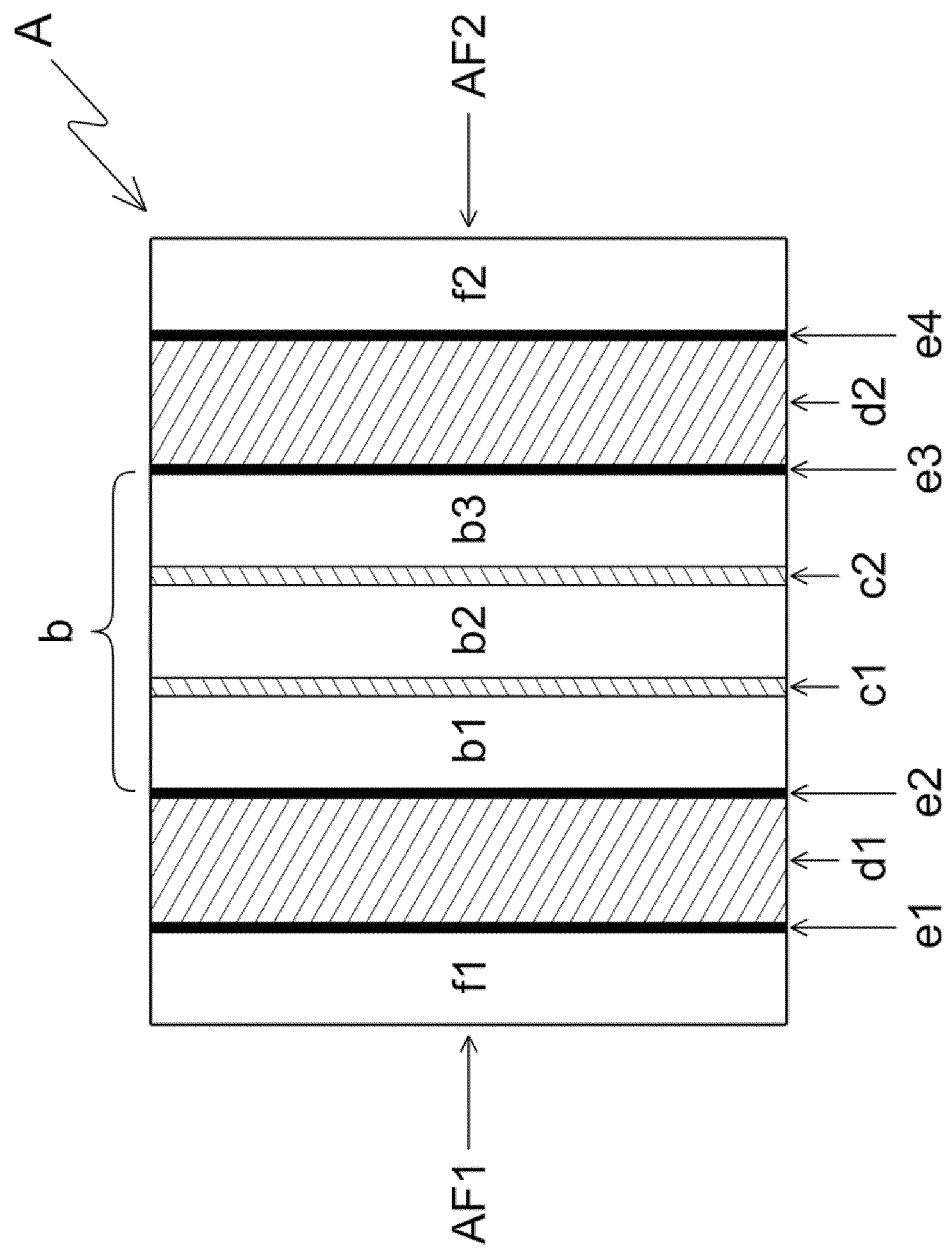

FIG. 2 depicts a vertical longitudinal section of a detail of a burglary-resistant fire protection glazing A of the prior art according to the German patent application DE 10 2010 037 966 A1.

The dimensions and materials of the components of the fire protection glazing A were the same as with the fire protection glazing 1 according to the invention. However, the structure of the fire protection glazing A was fundamentally different from the invention.

The fire protection glazing A had a centrally arranged fire protection unit b with three glass panes b1, b2 and b3, which were held together by two transparent, intumescent layers c1 and c2. On the two opposite surfaces of the fire protection unit b, a polycarbonate pane d1 and d2 was secured in each case by means of a film e2 and e3. A glass pane f1 and f2 was in turn secured on their outer surfaces in each case by means of the films e1 and e4.

The fire protection glazing A did in fact have satisfactory burglary resistance; however, due to the arrangement of the polycarbonate panes d1 and d2 in front of the fire protection unit b, the fire protection met no high requirements. The reason was that before the fire protection unit b could produce its effect, at least one polycarbonate pane d1 or d2 burned or was destroyed by fire.

The invention claimed is:

1. A transparent, burglary-resistant fire protection glazing, comprising
    one centrally arranged, burglary-resistant composite that includes two plastic planes that are connected by one adhesion-promoting layer,
    two fire protection units each arranged on a respective side of the centrally arranged, burglary-resistant composite, wherein each of the fire protection units includes three glass panes, wherein adjacent glass panes of each fire protection unit are adhesively bonded by a transparent, intumescent layer,
    two glass panes each arranged on a respective side of the centrally arranged, burglary-resistant composite, wherein each glass pane is arranged between the burglary-resistant composite and a respective fire protection unit and is immediately adjacently connected to the burglary-resistant composite via one adhesion-promoting layer; and
    wherein two outermost surfaces of the transparent, burglary-resistant fire protection glazing, opposite one another, are formed by the fire protection units.

2. The transparent, burglary-resistant fire protection glazing according to claim 1, wherein each of the transparent plastic panes of the burglary-resistant composite is made of polycarbonate or polymethyl methacrylate.

3. The transparent, burglary-resistant fire protection glazing according to claim 1, wherein a thickness of the burglary-resistant composite is at least 1 mm.

4. The transparent, burglary-resistant fire protection glazing according to claim 1, wherein a glass pane that is immediately adjacently connected to the plastic panes by adhesion-promoting layers is arranged between the two plastic panes.

5. The transparent, burglary-resistant fire protection glazing according to claim 1, wherein the adhesion-promoting layers are films made of polyvinyl butyral or polyurethane.

6. The transparent, burglary-resistant fire protection glazing according to claim 1, wherein the intumescent layers are made of alkali silicates and/or salt-filled aqueous acrylic polymers.

7. The transparent, burglary-resistant fire protection glazing according to claim 1, wherein the glass panes are made of soda lime glass.

8. The transparent, burglary-resistant fire protection glazing according to claim 1, which is UV-protected.

9. An antipanic door, including a fire protection glazing according to claim 1 arranged in a frame system and a one-sided opening mechanism that is arranged to open the antipanic door at any time in one direction.

10. A method for producing a transparent, burglary-resistant fire protection glazing according to claim 1, comprising constructing a laminate composite by precisely superimposing individual planar pane elements and introducing the pane elements into an autoclave furnace and adhesively bonding them at elevated temperature and pressure.

11. A method comprising utilizing a transparent, burglary-resistant fire protection glazing according to claim 1 as an architectural construction element.

12. A method comprising forming an antipanic glazing with the transparent, burglary-resistant fire protection glazing according to claim 1.

13. The transparent, burglary-resistant fire protection glazing according to claim 3, wherein the thickness of the burglary-resistant composite is from 1 mm to 15 mm.

14. The transparent, burglary-resistant fire protection glazing according to claim 13, wherein the thickness of the burglary-resistant composite is from 2 mm to 15 mm.

15. The transparent, burglary-resistant fire protection glazing according to claim 14, wherein the thickness of the burglary-resistant composite is from 6 mm to 12 mm.

16. The method according to claim 11, wherein the transparent, burglary-resistant fire protection glazing forms a glass door or a stationary glazing.

17. The method according to claim 11, wherein the transparent, burglary-resistant fire protection glazing is arranged in a museum, a bank, in an airport, a terminal, or a railway station.

18. The transparent, burglary-resistant fire protection glazing according to claim 1, wherein a same number of glass panes is arranged on the respective side of the centrally arranged, burglary-resistant composite.

* * * * *